US010885657B2

(12) United States Patent
Chapman et al.

(10) Patent No.: US 10,885,657 B2
(45) Date of Patent: Jan. 5, 2021

(54) CONFIGURATION FOR INDICATING IMAGE CAPTURE DEVICE POSITION

(71) Applicant: Disney Enterprises, Inc., Burbank, CA (US)

(72) Inventors: Steven Chapman, Thousand Oaks, CA (US); Mehul Patel, Stevenson Ranch, CA (US); Joseph Popp, Cerritos, CA (US); Alice Taylor, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 105 days.

(21) Appl. No.: 16/177,302

(22) Filed: Oct. 31, 2018

(65) Prior Publication Data
US 2020/0134856 A1 Apr. 30, 2020

(51) Int. Cl.
*G06T 7/70* (2017.01)
*G06T 7/73* (2017.01)
*G08B 6/00* (2006.01)

(52) U.S. Cl.
CPC ............... *G06T 7/70* (2017.01); *G06T 7/73* (2017.01); *G08B 6/00* (2013.01); *G06T 2207/10016* (2013.01); *G06T 2207/30241* (2013.01); *G06T 2219/028* (2013.01)

(58) Field of Classification Search
CPC ... G06T 7/70; G06T 7/73; G06T 2207/10016; G06T 2207/30241; G06T 2219/028; G08B 6/00
See application file for complete search history.

(56) References Cited

U.S. PATENT DOCUMENTS

| 8,259,161 | B1* | 9/2012 | Huang ................. G06K 9/6215 348/50 |
| 9,033,598 | B2 | 5/2015 | Ryan et al. |
| 9,325,861 | B1* | 4/2016 | Ettinger ............ H04N 1/00183 |
| 9,355,433 | B1* | 5/2016 | Adsumilli ............. G06T 3/0093 |
| 9,390,344 | B2 | 7/2016 | Pirchheim et al. |
| 9,667,862 | B2* | 5/2017 | Rapoport ........... H04N 5/23206 |
| 9,799,142 | B2 | 10/2017 | Mullins et al. |
| 9,998,663 | B1* | 6/2018 | Francois ............ H04N 5/23238 |
| 10,446,190 | B1* | 10/2019 | Liu ..................... G06F 16/5866 |
| 2009/0208062 | A1* | 8/2009 | Sorek ................. H04N 5/23229 382/107 |

(Continued)

OTHER PUBLICATIONS

Wang et al. "Hyper-lapse from multiple spatially-overlapping videos." IEEE Transactions on Image Processing 27.4 (2017): 1735-1747. (Year: 2017).*

(Continued)

*Primary Examiner* — Katrina R Fujita
(74) *Attorney, Agent, or Firm* — Dorsey & Whitney LLP

(57) ABSTRACT

A process determines a position of an image capture device with respect to a physical object. The position corresponds to a vantage point for an initial image capture of the physical object performed by the image capture device at a first time. Further, the process generates an image corresponding to the position. In addition, the process displays the image on the image capture device. Finally, the process outputs one or more feedback indicia that direct a user to orient the image capture device to the image for a subsequent image capture at a second time within a predetermined tolerance threshold of the vantage point.

21 Claims, 10 Drawing Sheets

(56) References Cited

U.S. PATENT DOCUMENTS

| | | | | |
|---|---|---|---|---|
| 2011/0234855 | A1* | 9/2011 | Matsumoto | H04N 5/23238 348/231.99 |
| 2011/0320116 | A1* | 12/2011 | DeMaio | G01C 21/3638 701/457 |
| 2012/0105682 | A1* | 5/2012 | Hata | H04N 5/23238 348/239 |
| 2014/0118483 | A1* | 5/2014 | Rapoport | H04N 5/23293 348/36 |
| 2015/0249785 | A1* | 9/2015 | Mehta | H04N 5/23238 348/36 |
| 2016/0086336 | A1* | 3/2016 | Lin | G06T 7/74 348/50 |
| 2016/0127641 | A1* | 5/2016 | Gove | G06T 1/00 348/143 |
| 2017/0094158 | A1* | 3/2017 | Van Olst | H04N 5/23219 |
| 2017/0124693 | A1 | 5/2017 | Ramalingam et al. | |
| 2017/0228878 | A1 | 8/2017 | Goldman et al. | |
| 2017/0287221 | A1* | 10/2017 | Ghaly | G02B 27/0172 |
| 2018/0005431 | A1 | 1/2018 | Yoshioka et al. | |
| 2018/0115706 | A1* | 4/2018 | Kang | H04N 5/23238 |

OTHER PUBLICATIONS

Ligorio, Gabriele, et al., "Extended Klaman Filter-Based Methods for Pose Estimation Using Visual, Inertial and Magnetic Sensors: Comparative Analysis and Performance Evaluation," Turingsense EU LAB; Scuola Superiore Sant'Anna, The Biorobotics Insititute, https://www.researchgate.net/publication/235405231_Extended_Kalman_Filter-Based_Methods_for_Pose_Estimation_Using_Visual_Inertial_and_Magnetic_Sensors_Comparative_Analysis_and_Performance_Evaluation, Feb. 2013.

Zhang, Michael, "MIOPS Capsule360: The World's 'Most Compact and Versatile Motion Box'", PetaPixel, https://petapixel.com/2018/06/12/miops-capsule360-the-worlds-most-compact-and-versatile-motion-box/, Jun. 12, 2018.

* cited by examiner

CONFIGURATION FOR INDICATING IMAGE CAPTURE DEVICE POSITION

BACKGROUND

1. Field

This disclosure generally relates to the field of image capture devices.

2. General Background

Conventional image capture systems typically require various physical equipment for performing image capture with the degree of precision necessary for certain filming techniques. For example, physical support devices such as tripods, camera cranes, motion control arms, dollies, tracks, etc. are often used to maintain the position of a camera when filming a video in time-lapse (capturing film frames at a slower rate than playback), with slider shots (sliding the camera to capture imagery), or with visual effects ("vfx") miniature element composite shots. Such physical support devices repeatedly position the camera at identical, or substantially identical, vectors, speeds, and/or yaw/pitch/roll angles. Yet, using such physical support devices is often cumbersome, restrictive, time-consuming, and expensive.

SUMMARY

In one aspect, a computer program product comprises a non-transitory computer readable storage device having a computer readable program stored thereon. The computer readable program when executed on a computer causes the computer to determine, with a processor, a position of an image capture device with respect to a physical object. The position corresponds to a vantage point for an initial image capture of the physical object performed by the image capture device at a first time. Further, the computer is caused to generate, with the processor, an image corresponding to the position. In addition, the computer is caused to display, with the processor, the image on the image capture device. Finally, the computer is caused to output, with the processor, one or more feedback indicia that direct a user to orient the image capture device to the image for a subsequent image capture at a second time within a predetermined tolerance threshold of the vantage point.

In another aspect, the computer readable program when executed on a computer causes the computer to determine, with a processor, a plurality of positions of an image capture device with respect to a physical object. The plurality of positions corresponds to a motion path of vantage points for filming the physical object at a subsequent time. Further, the computer is caused to generate, with the processor, a plurality of images corresponding to the motion path. In addition, the computer is caused to display, with the processor, the plurality of images on the image capture device. Finally, the computer is caused to output, with the processor, one or more feedback indicia that direct a user to orient the image capture device along the motion path at the subsequent time for a plurality of subsequent image captures at the plurality of positions.

In yet another aspect, the computer readable program when executed on a computer causes the computer to receive, with a processor, a plurality of positions corresponding to a motion path. Further, the computer is caused to generate, with the processor, a plurality of images corresponding to the motion path. In addition, the computer is caused to display, with the processor, the plurality of images on the image capture device. Moreover, the computer is caused to output, with the processor, one or more feedback indicia that direct a user to orient an image capture device along the motion path with respect to a plurality of vantage points for filming a physical object.

In another aspect, an apparatus has a processor that performs the functionality of the computer readable program. In yet another aspect, a process performs such functionality.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration is provided to indicate one or more positions of an image capture device (e.g., camera). One or more sensors, which are either built-in to the image capture device or in operable communication with the image capture device, determine whether the image capture device is in the same position, or within a predetermined threshold of, a previously determined position for the image capture device. That previously determined position may have been an actual position at which the image capture device was previously situated for filming, a position along a motion path previously taken by the image capture device without fully filming, a position along a motion path previously taken by another image capture device, and/or a position along a motion path as planned via computer generated simulation. Further, the configuration may provide an indication to the user as to how the user may reorient the image capture device to obtain the orientation of the image capture device that will match, or substantially match within the predetermined threshold, the previously determined position.

Figure 1:
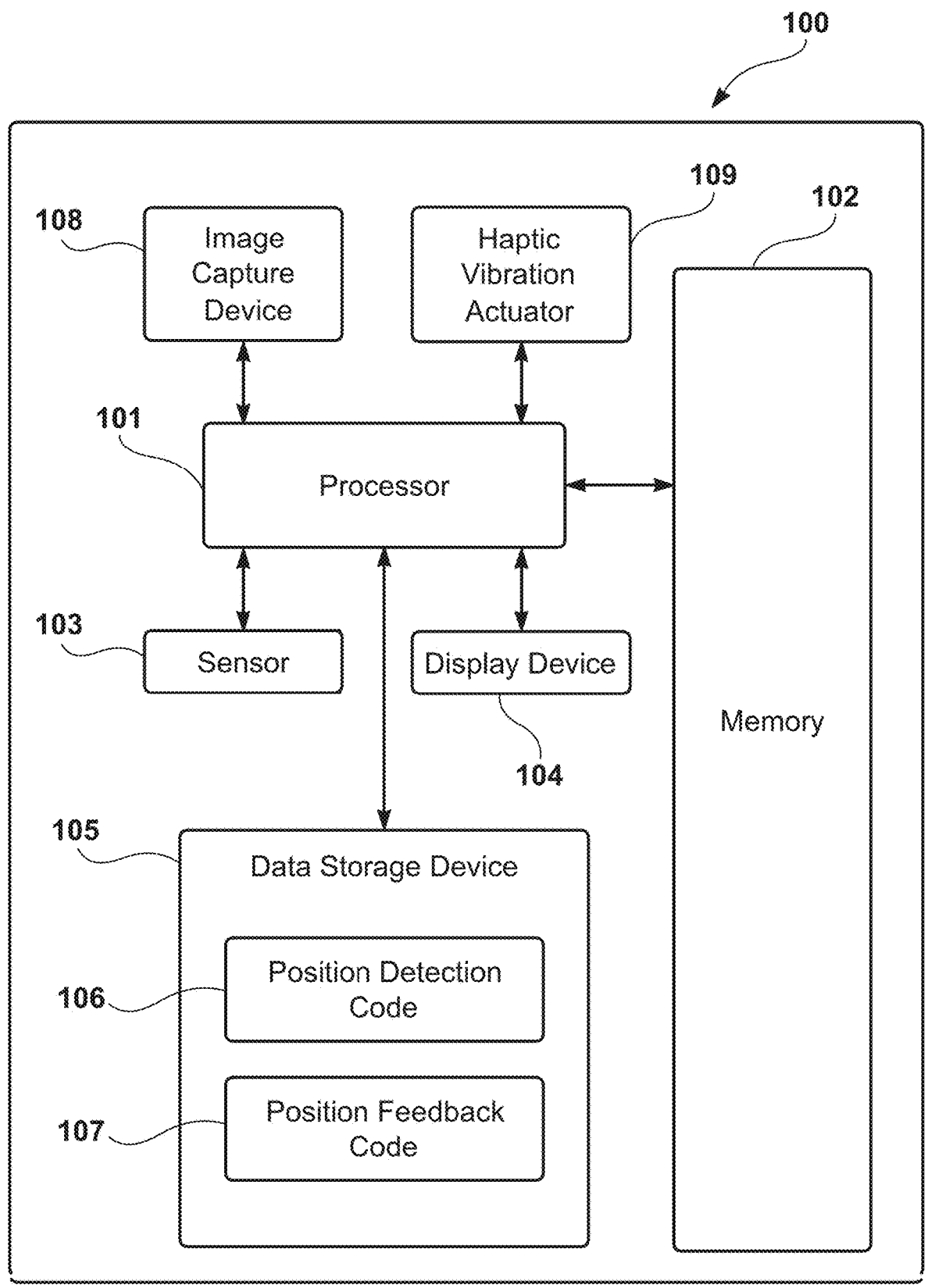
FIG. 1 illustrates the internal components of a position detection system.

FIG. 1 illustrates the internal components of a position detection system 100. For example, the position detection system 100 may be built into an image capture device 108 itself (e.g., via software and/or hardware), may be operably attached to the image capture device 108 (e.g., via an adhering mechanism such as a clip, glue, etc.), or may be in operable communication with the image capture device 108. For instance, the image capture device 108 may be a mobile computing device (e.g., smartphone, tablet device, virtual reality ("VR") head-mounted display, augmented reality ("AR") glasses, smart wearable device, etc.) with image capture capabilities via a built-in camera.

Further, the position detection system 100 includes a processor 101, a memory 102 (e.g., random access memory ("RAM") and/or read only memory ("ROM")), one or sensors 103, a display device 104, a haptic vibration actuator 109, and a data storage device 105. The one or more sensors 103 may include a magnetometer to determine which way is north in relation to the image capture device 108, an accelerometer to determine angles and orientation of the image capture device 108, a global positioning system ("GPS") to determine location of the image capture device 108, a gyroscope to detect attitude, an electric field sensor, a liquid gravitational sensor, radio signal strength sensor, direction detector, etc.

In addition, or as an alternative, to the one or more sensors 103, various other devices may be used to orient the image capture device 108 based on terrestrial or celestial objects. For example, various optical alignment and/or image recognition devices may be used to orient the image capture device 108 with respect to various objects that are distinct from manually placed filming set pieces (e.g., background buildings, landscape features, etc.).

Additionally, the display device 104 may be used to view the scene to be filmed for generating predetermined image capture device positions. For instance, the user may establish a predetermined trajectory of one or image capture device positions by moving the image capture device 108 along the predetermined trajectory, while viewing the path via the display device 104. Further, the display device 104 may display a GUI with which the user may interact to generate the one or more predetermined image capture device positions. For example, the user may activate various virtual indicia (e.g., buttons) on the GUI at positions along the path of the image capture device 108 to demarcate the predetermined image capture device positions. The GUI may then display the predetermined image capture device positions via one or more indicia (e.g., floating images, icons, symbols, etc.).

Alternatively, or in addition, the display device 104 may display an additional GUI for providing feedback to the user as to how the image capture device 108 should be reoriented to be repositioned at the previously generated image capture device positions. For example, when the user wants to resume image capture at a predetermined image capture device position, the additional GUI may display various orientation indicia (e.g., virtual arrows, imagery, etc.) that provide feedback to the user as to how to reorient the image capture device 108 to be positioned at the previous image capture device position. The feedback provided to the user is not limited to visual feedback. For example, haptic feedback may be provided to the user via the haptic vibration actuator 109, which may be in operable communication with the image capture device 108, as to whether or not the user is moving the image capture device 108 close enough to, and/or orienting the image capture device 108 at the correct angle with respect to, the previously determined image capture device position.

In one aspect, the display device 104 is integrated within the position detection system 100 (e.g., via a mobile computing device display screen). In another aspect, the display device 104 may be distinct from the device that encompasses the image capture device 108. For example, a user may use a mobile phone to move along a path for generating predetermined image capture device positions, but may use a distinct display device (cinema camera display, television, computer monitor, etc.) to view the scenery while the mobile phone is being moved along the trajectory path for trajectory generation and/or repositioning at previously determined positions.

The processor 101 may use the position detection code 106 stored on the data storage device 105 to determine the position of the image capture device 108 for image capture device position generation and/or positioning of the image capture device 108 at a previously determined image capture device position. Further, the processor 101 may use the position feedback code 107 to generate feedback (e.g., visual feedback via the display device 104, haptic feedback via the haptic vibration actuator 109, etc.) as to how the user may reposition the image capture device 108 at the previously determined position.

Figure 2:
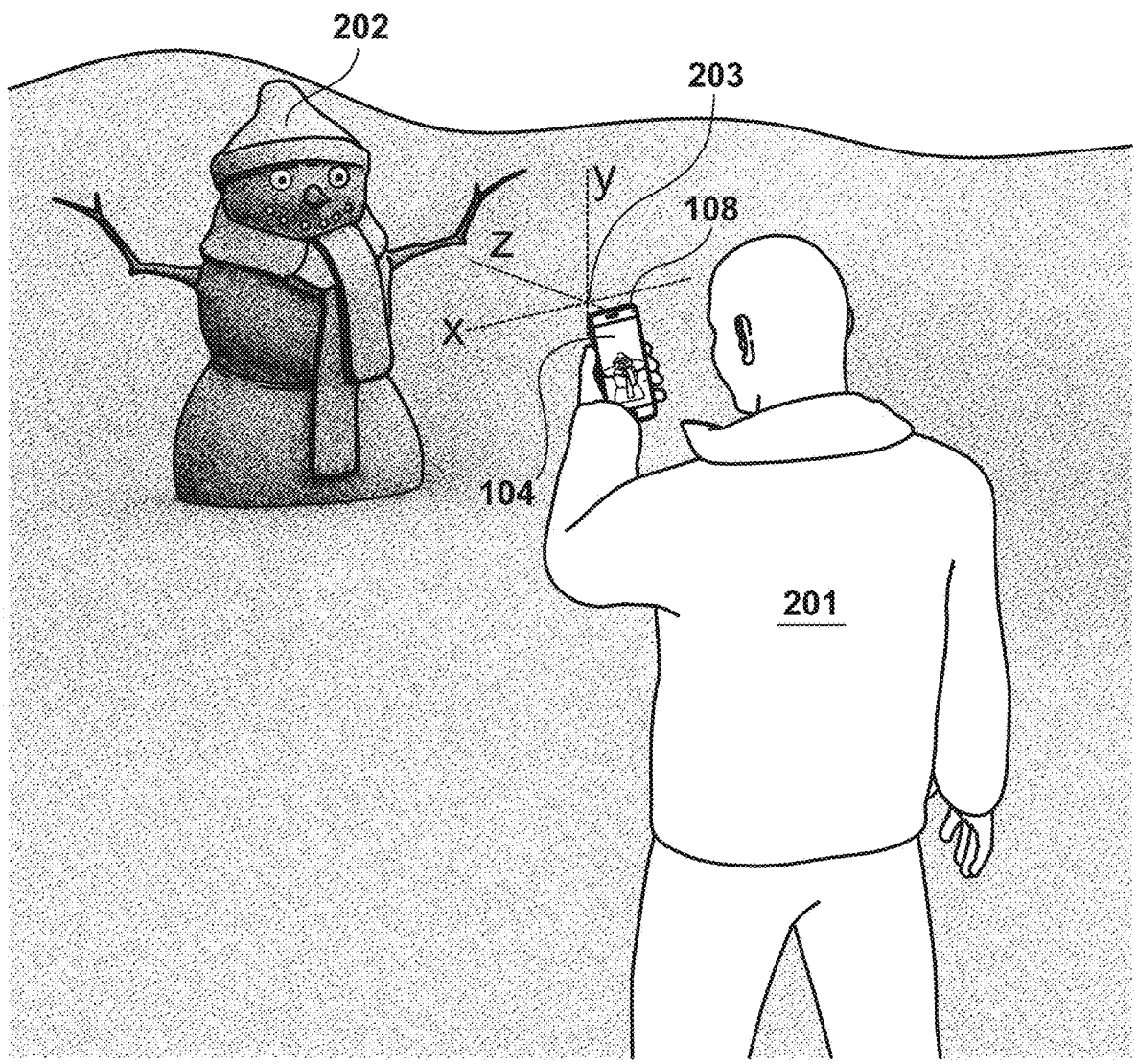
FIG. 2 illustrates an example of a user using a smartphone as the image capture device.

FIG. 2 illustrates an example of a user 201 using a smartphone as the image capture device 108. The user 201 is situated in front of a snowman 202 and has decided to view the snowman 202, via the display screen 104 integrated within the image capture device 108, at a particular angle 203 for a time-lapse video that will be filmed over the span of a certain time period (e.g., minutes, hours, days, etc.) at the angle 203. To ensure that the user 201, or possibly a different user, can obtain the same angle 203, or substantially the same angle 203 within a predetermined threshold of tolerance, the processor 101 (FIG. 1) positioned within the smartphone uses the position detection code 106 to detect the position and orientation of the smartphone. For example, the processor 101 may use one or more sensors 103 to detect the various position and orientation measurements for storage and subsequent usage. Accordingly, the user 201, or a different user, may return to the same scenery and with the same, or different, image capture device 108 (e.g., smartphone, tablet device, cinema camera, etc.) to continue filming the snowman 202 at different time intervals, but from the same, or substantially the same, vantage point.

Figure 3:
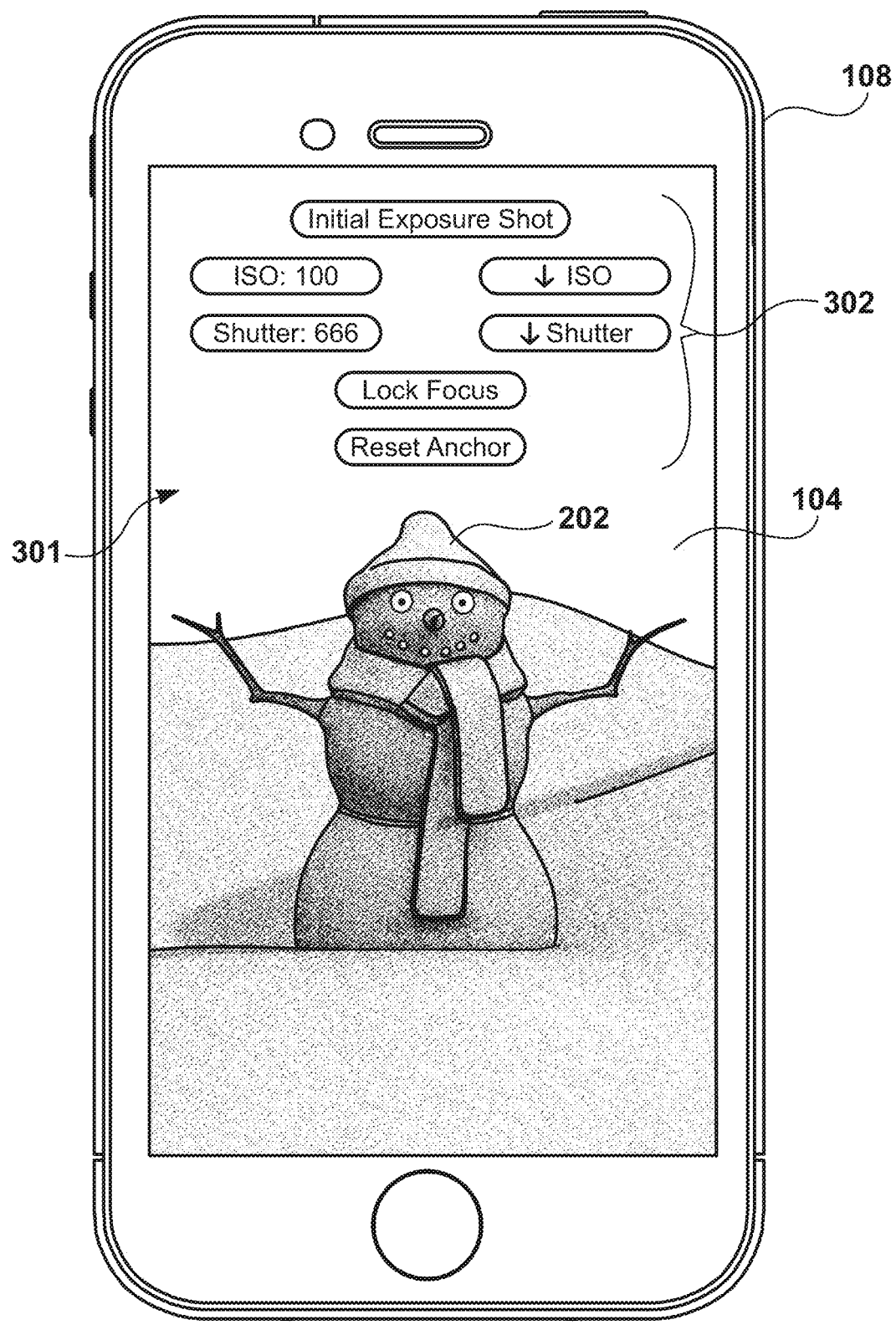
FIG. 3 illustrates an example of a graphical user interface ("GUI") that may be displayed by the display screen of the image capture device illustrated in FIGS. 1 and 2.

Further, FIG. 3 illustrates an example of a GUI 301 that may be displayed by the display screen 104 of the image capture device 108 illustrated in FIGS. 1 and 2. For example, as the user 201 illustrated in FIG. 1 is attempting to the find the desired vantage point for filming the snowman 202, the user 201 is able to view the GUI 301 and select a position marker indicium to demarcate the desired vantage point.

Further, the user may interact with a variety of user input indicia 302 displayed on the GUI 301 to demarcate one or more desired vantage points. For example, the user may select an International Standards Organisation ("ISO") film sensitivity, a shutter speed, a focus, and an anchor for a particular vantage point.

For instance, the user 201 may set an anchor on the display screen 104 according to the position and orientation of the image capture device 108 at the angle 203, as illustrated in FIG. 2. The image capture device 108 may then be removed from the physical location at which the snowman 202 is positioned, yet be able to be fully repositioned and reoriented at the same angle 203 for subsequent filming at a subsequent time interval.

Figure 4:
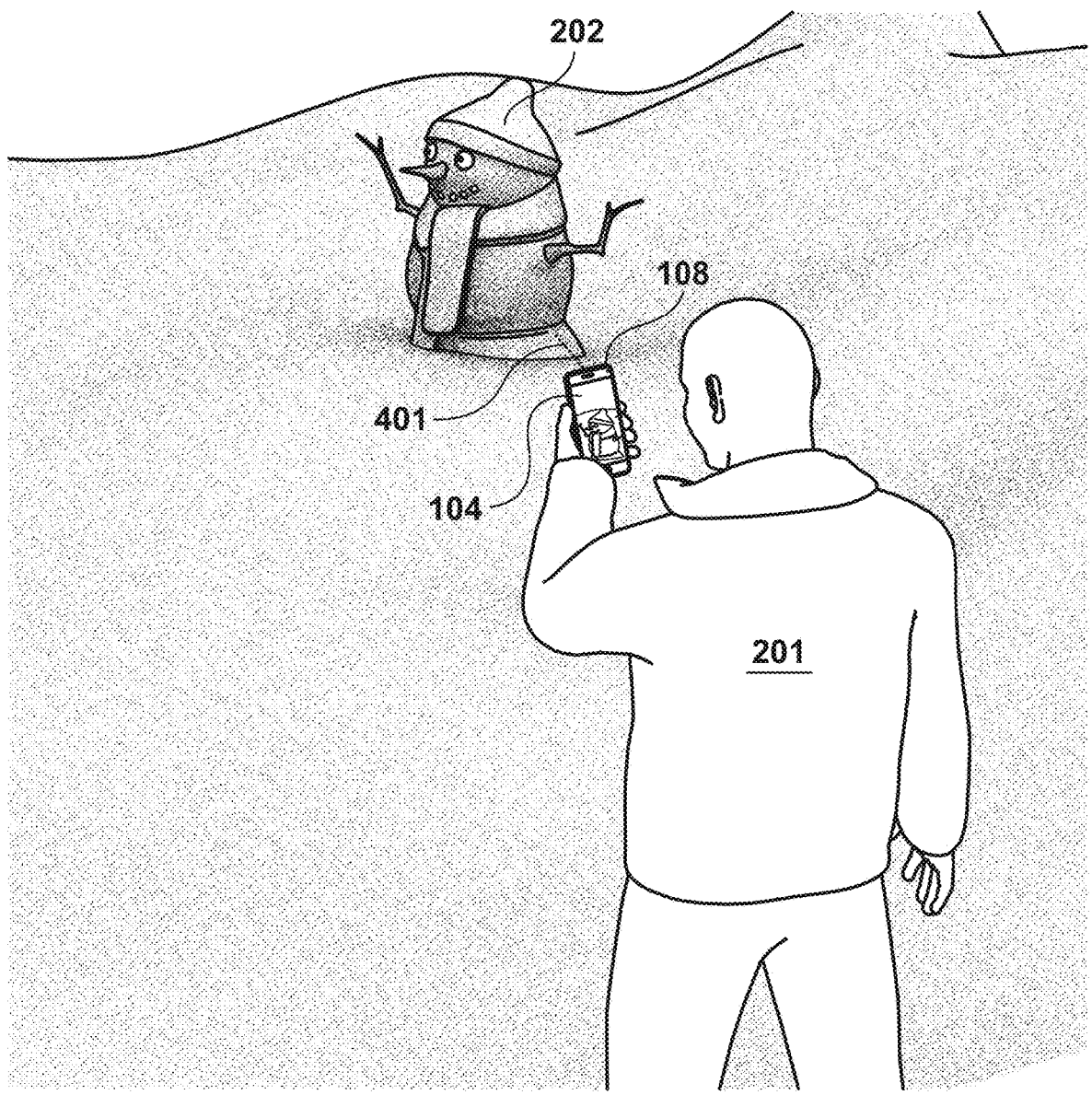
FIG. 4 illustrates an example of the user illustrated in FIG. 2 attempting to resume filming at a previously determined image capture position.

FIG. 4 illustrates an example of the user 201 illustrated in FIG. 2 attempting to resume filming at a previously determined image capture position. For instance, the user 201 may have filmed the snowman 202 at the angle 203, as illustrated in FIG. 2, during the early part of a snow storm. To film a time-lapse video, the user 201 may want to film the snowman 202 at the same angle 203 every hour throughout the day. The user may enter the scenery with the image capture device 108 being positioned at an angle 401, which is different than the previously determined image capture position illustrated in FIG. 2 at the angle 203. The user 201 may then want to capture an image of the snowman 202 from the same angle 203, but an hour after the initial image was captured. For example, an additional few inches of snow may have fallen on the ground since the initial image was captured.

The processor 101 (FIG. 1) may be positioned within the image capture device 108, and may use the position feedback code 107 to provide one or more feedback outputs (visual, audio, haptic, etc.) to the user 201. Such feedback outputs may direct the user 201 how to position the image capture device 108 in a manner that obtains the previously determined position and orientation at the angle 203.

Figure 5:
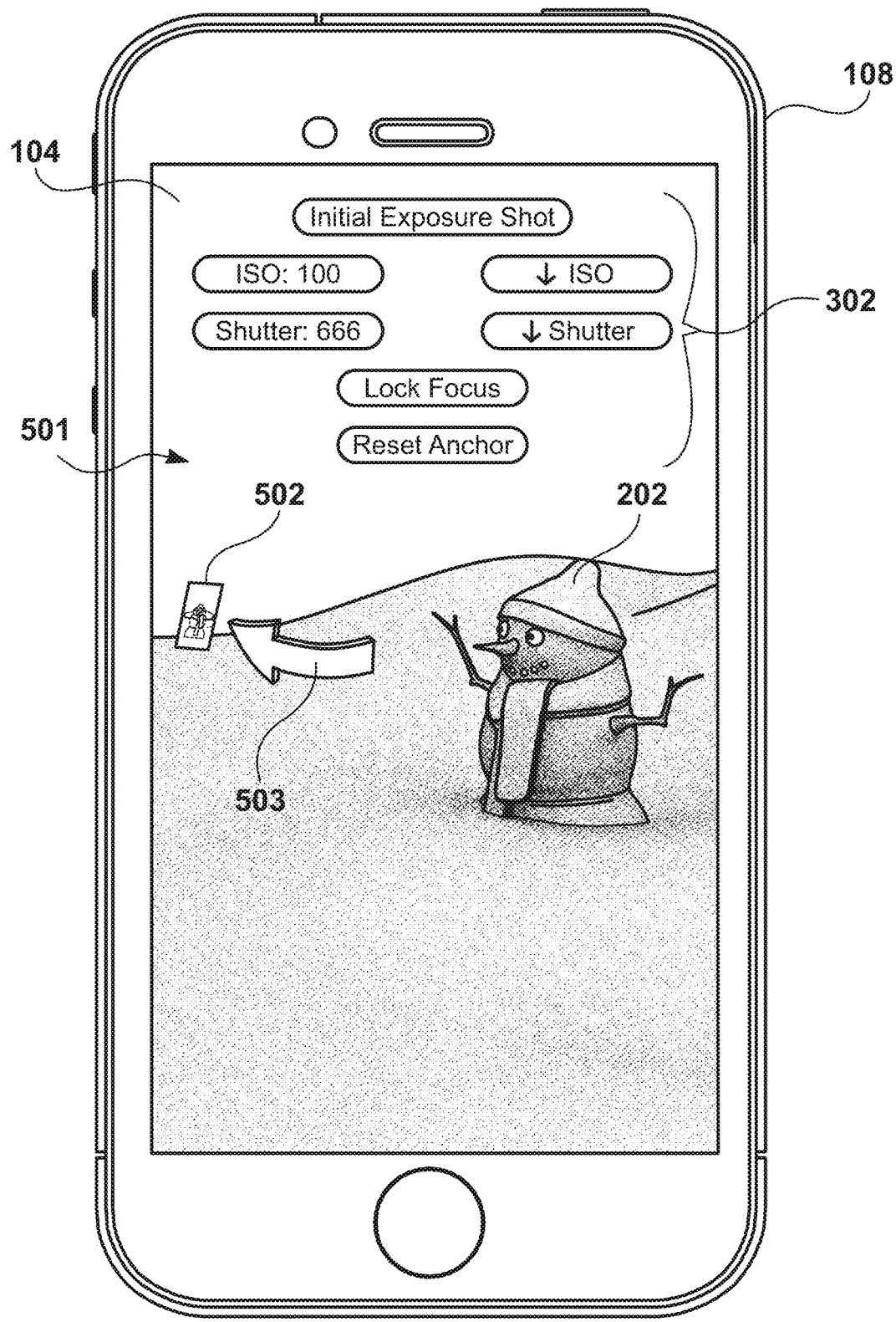
FIG. 5 illustrates an example of a GUI that may be displayed by the display screen of the image capture device to help guide the user how to move and reorient the image capture device from the angle illustrated in FIG. 4 to obtain the previously determined angle displayed in FIG. 2.

FIG. 5 illustrates an example of a GUI 501 that may be displayed by the display screen 104 of the image capture device 108 to help guide the user how to move and reorient the image capture device 108 from the angle 401 illustrated in FIG. 4 to obtain the previously determined angle 203 as displayed in FIG. 2. For example, the user 201 may view a floating image 502 at the position and orientation at which the smartphone was previously located when capturing the initial image at the angle 203. Further, the processor 101 (FIG. 1) may use the position detection code 106 to determine the current position of the smartphone relative to the previously determined position, which is indicated in the GUI 501 by the floating image 502. Moreover, the processor 101 may use the position feedback code 107 to generate one or more virtual indicia (e.g., arrow 503) to visually direct the user 201 in the direction and/or orientation that the smartphone should be placed so that the smartphone is positioned at the same, or substantially the same, angle 203 illustrated in FIGS. 2 and 4. Additional, or alternative, feedback outputs may be used to help guide the user 201 in moving the smartphone to the position at the angle 203. For example, the processor 101 may use the haptic vibration actuator 109 (FIG. 1) in conjunction with the arrow 503 to help guide the user 201 as to when the user 201 is moving the smartphone closer to, or farther away from, the previously determined position indicated by the floating image 502.

In one aspect, the user 201 may then perform image capture from the previously determined position. In another aspect, the processor 101 (FIG. 1) is configured to perform automatic image capture upon the image capture device 108 being positioned at the previously determined position.

Figure 6:
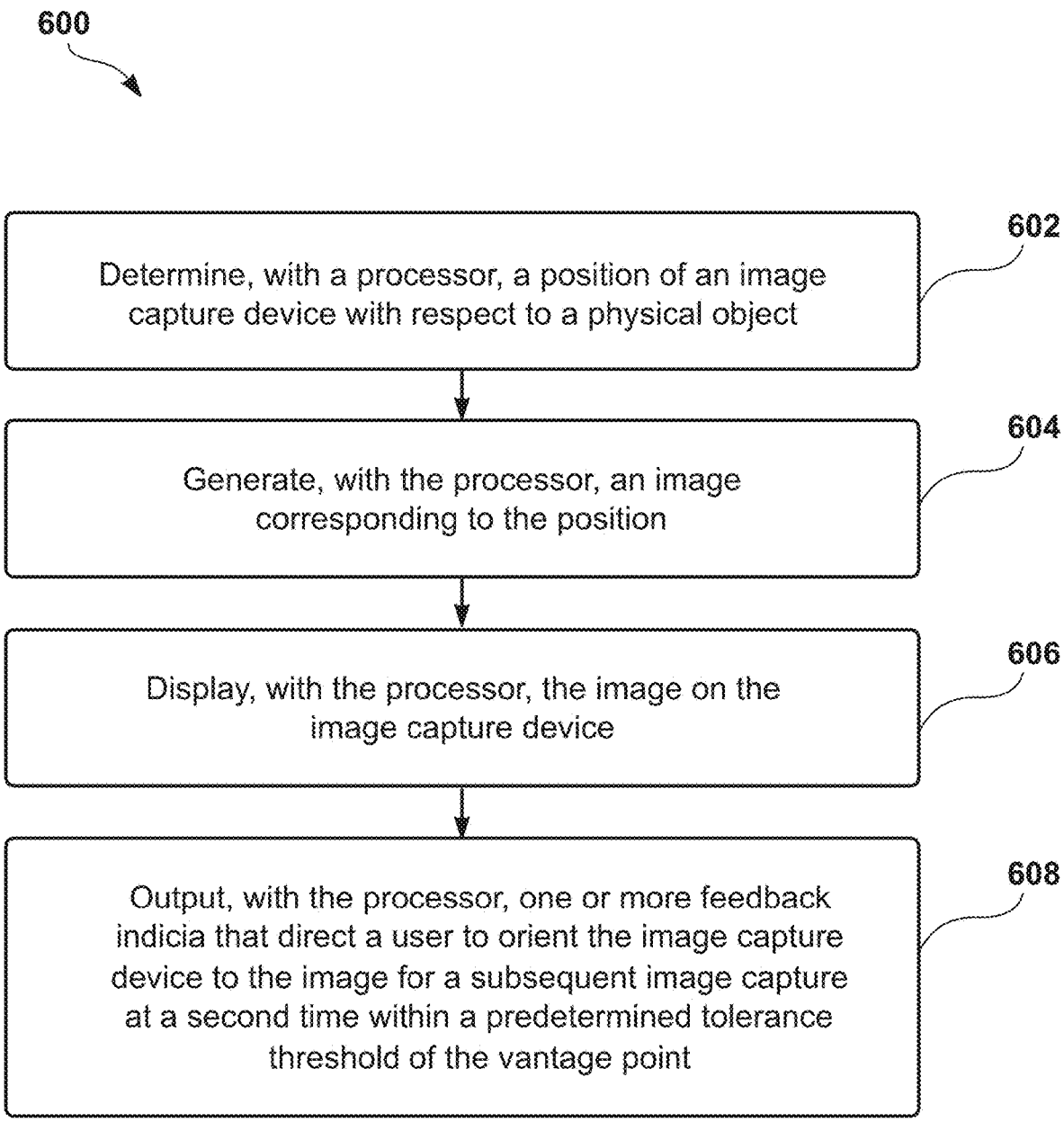
FIG. 6 illustrates a process that may be used by the processor illustrated in FIG. 1 to determine the position of the image capture device illustrated in FIGS. 2 and 4 for subsequent filming.

FIG. 6 illustrates a process 600 that may be used by the processor 101 illustrated in FIG. 1 to determine the position of the image capture device 108 illustrated in FIGS. 2 and 4 for subsequent filming. At a process block 602, the process 600 determines, with the processor 101, a position of the image capture device 108 with respect to a physical object. The physical object may or may not be placed by the user 201. For example, the physical object may be the snowman 202, which may or may not have been built by the user 201. As another example, the physical object may be the planet Earth (i.e., the position of the image capture device 108 is measured in relation to particular global position coordinates). Moreover, the position corresponds to a vantage point for an initial image capture of the physical object performed by the image capture device 108 at a first time.

Further, at a process block 604, the process 600 generates, with the processor 101, an image corresponding to the position. In addition, at a process block 606, the process 600 displays, with the processor 101, the image on the image capture device 108. Further, at a process block 608, the process 600 outputs, with the processor 101, one or more feedback indicia that direct the user 201 to orient the image capture device 108 to the image for a subsequent image capture at a second time within a predetermined tolerance threshold of the vantage point.

Figure 7:
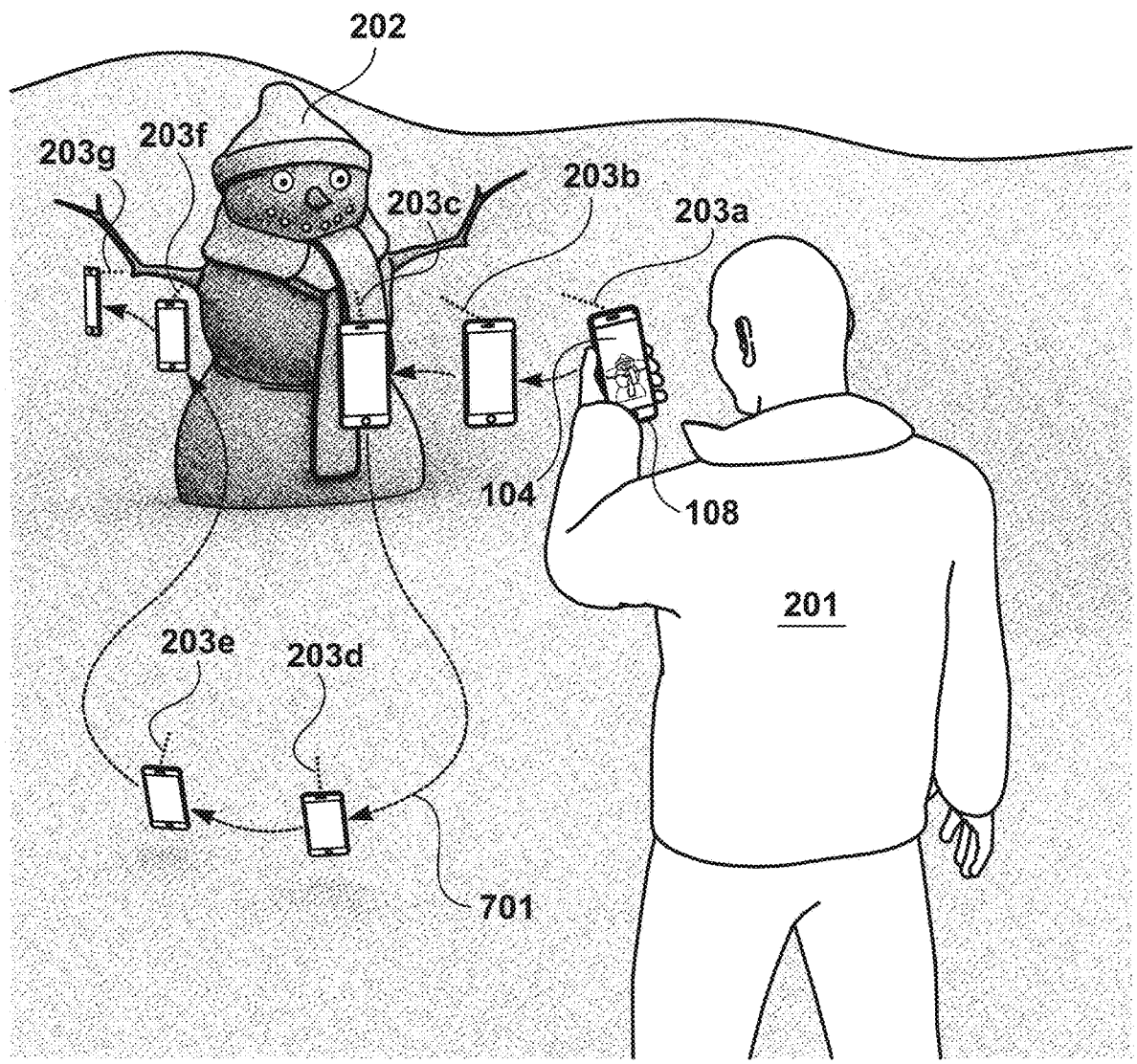
FIG. 7 illustrates an example of the image capture device being used to record a virtual motion path for subsequent filming.

In another aspect, rather than having the image capture device 108 (FIG. 1) return to the same angle 203 (FIG. 2) for subsequent filming, the image capture device 108 may return to a plurality of angles along a previously determined motion path. FIG. 7 illustrates an example of the image capture device 108 being used to record a virtual motion path 701 for subsequent filming. For instance, the user 201 may use the GUI 301 illustrated in FIG. 3 to record a plurality of previously determined positions at a variety of different angles 203*a-g*. For example, the virtual motion path 701 may be used to generate new positions in a virtual slider scene. As another example, the virtual motion path 701 may be used to generate new positions for a scaled up or scaled down version of a composite shot (e.g., a handheld shot of a character) and then a second version of the same motion for a to-be-composited miniature background.

Figure 8:
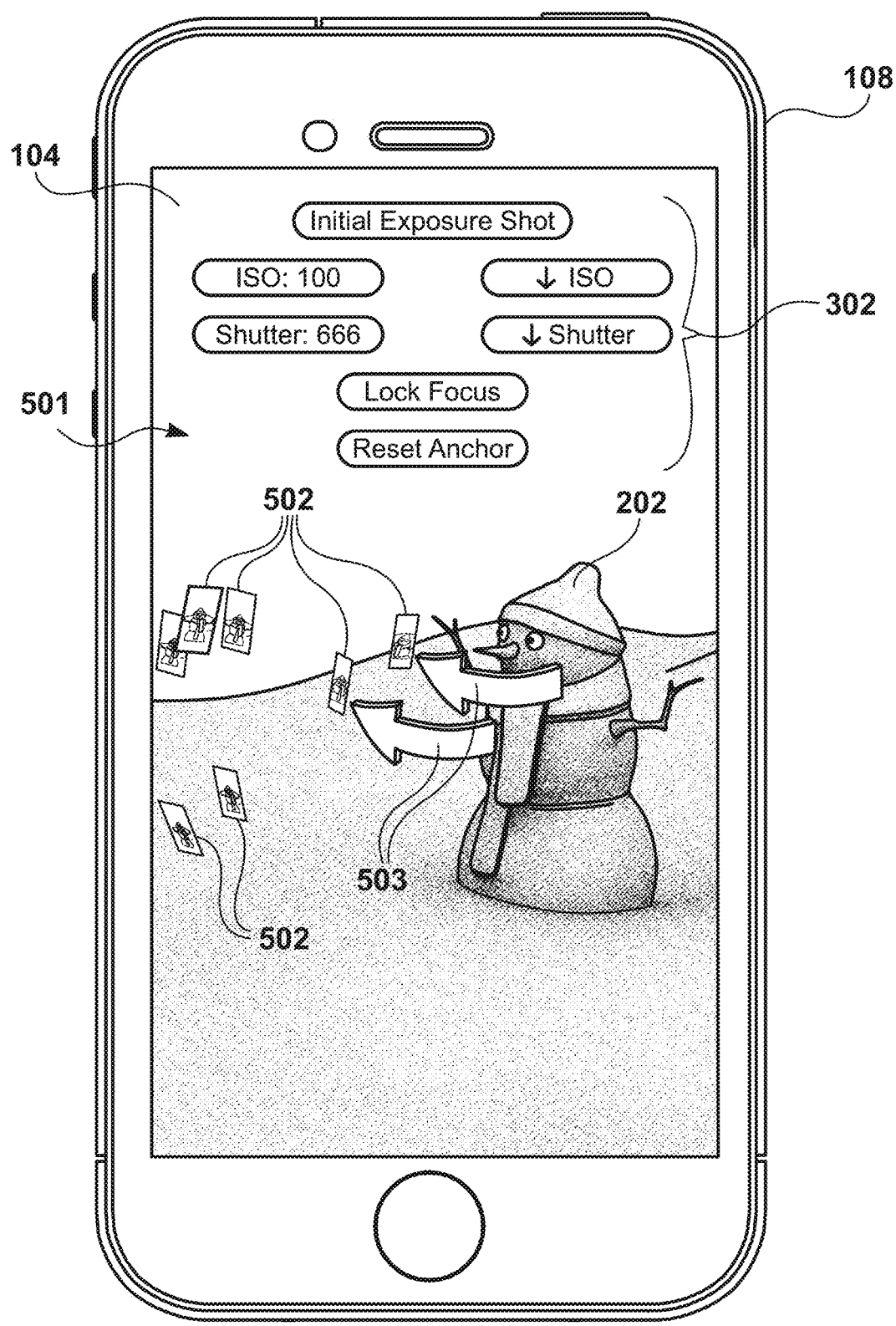
FIG. 8 illustrates an example of the GUI illustrated in FIG. 5, which may be displayed by the display screen of the image capture device to help guide the user how to move and reorient the image capture device amongst the various angles displayed along the motion path in FIG. 7.

FIG. 8 illustrates an example of the GUI 501 illustrated in FIG. 5, which may be displayed by the display screen 104 of the image capture device 108 to help guide the user 201 how to move and reorient the image capture device 108 amongst the various angles 203*a-g* displayed along the motion path 701 in FIG. 7. For example, an arrow 503 may be used to provide visual feedback to the user 201 as to which direction the user should move the image capture device 108 to reach each of the previously determined positions along the virtual motion path 701.

Although the motion path in FIG. 7 is illustrated for purposes of generating a motion path with the same, or a different, image capture device 108 as filming, the motion path 701 may be generated via a different type of device or system than that which performs the filming. For example, a different user may draw a motion path 701 on a tablet device for the same scene, or possibly a different scene. That motion path 701 may then be applied to the particular scene illustrated in FIG. 7 for filming purposes. As another example, a motion path 701 used in a previously filmed, and/or computer-generated, video may be applied to the particular scene illustrated in FIG. 7 for filming purposes.

Figure 9:
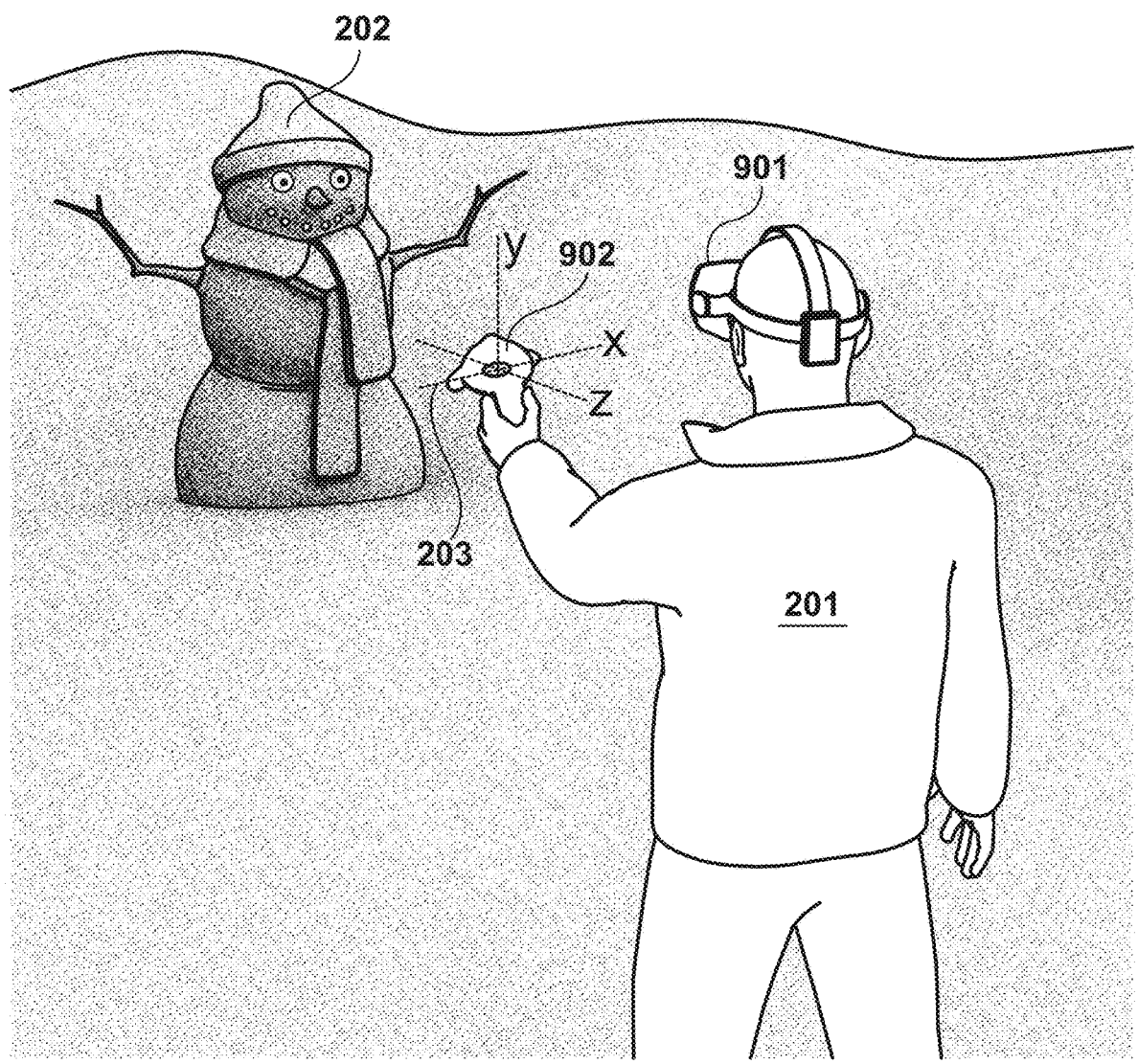
FIG. 9 illustrates an example of an alternative image capture device that is used to record previous positions and provide feedback to the user for subsequent filming.

FIG. 9 illustrates an example of an alternative image capture device 108 that is used to record previous positions and provide feedback to the user 201 for subsequent filming. For example, the image capture device 108 may be a virtual reality ("VR") headset 901. The user 201 may perform still image capture, pan around a scene to record a motion path, etc. via motions of the head of the user 201. Further, the user 201 may interact with the GUI 301 illustrated in FIG. 3 and the GUI 501 illustrated in FIG. 5, which are displayed on an interior display screen of the VR headset 901, to view an object such as the snowman 202 from a particular angle of interest 203. The user 201 may then perform a user input via the GUI 301 via a user input device, such as a hand controller 902. Alternatively, the user 201 may perform the user input via the VR headset 901 itself. For example, the user 201 may activate a button/switch positioned on the VR headset 901, provide voice commands via a microphone integrated within, or in operably communication with, the VR headset 901, etc.

Accordingly, a variety of different systems and/or devices may be used to generate the previously determined positions and/or provide feedback to the user 201 during subsequent filming at the previously determined positions. For example, a smartphone may be used as the image capture device 108 to demarcate the previously determined positions, and a cinema camera may receive those previously determined positions for display on a corresponding display screen during subsequent filming by a cinema camera operator. For instance, one or more sensors 108 may be positioned in a camera-shoe mounting device that is adhered to the cinema camera.

In another aspect, the configurations provided for herein may be used to replace props or other scene elements at the same position if they had been moved for security, safety, etc. Such objects may be returned to precisely the same position as during the initial filming to resume filming in a continuous manner. In other words, the configurations provided for herein allow not only the user 201 (FIG. 2) to return to a previously determined position for filming, but also allow for the objects being filmed to be moved to a position that conforms to the previously determined angle and position of the image capture device 108.

Figure 10:
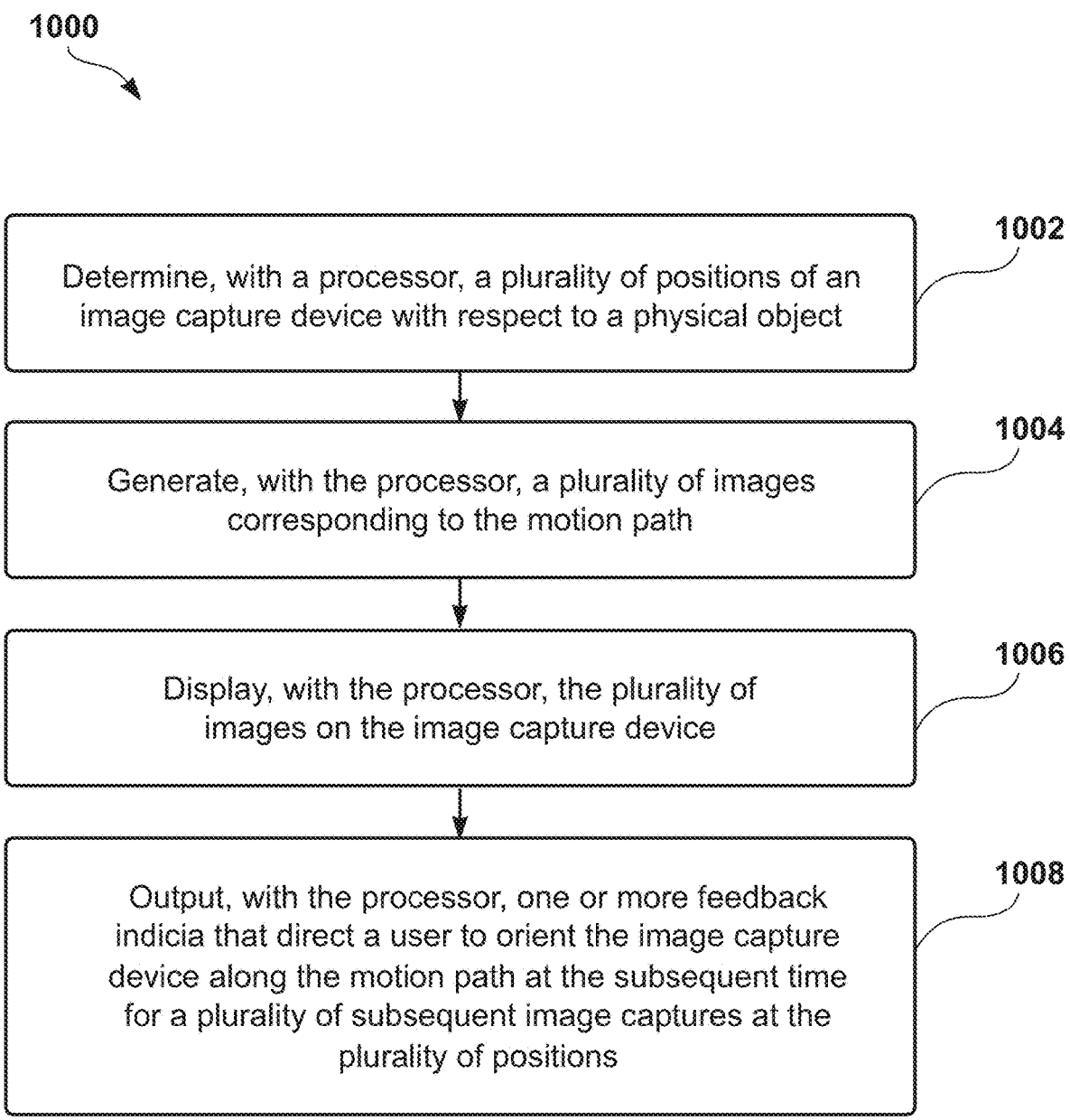
FIG. 10 illustrates a process that is used by the processor illustrated in FIG. 1 to generate the motion path illustrated in FIG. 7.

FIG. 10 illustrates a process 1000 that is used by the processor 101 illustrated in FIG. 1 to generate the motion path 701 illustrated in FIG. 7. At a process block 1002, the process 1000 determines, with the processor 101, a plurality of positions of the image capture device 108 with respect to a physical object. The plurality of positions corresponds to the motion path 701 of vantage points for filming the physical object at a subsequent time. Further, at a process block 1004, the process 1000 generates, with the processor 101, a plurality of images corresponding to the motion path 701. Moreover, at a process block 1006, the process 1000 displays, with the processor 101, the plurality of images on the image capture device 108. Additionally, at a process block 1008, the process 1000 outputs, with the processor 101, one or more feedback indicia that direct a user to orient the image capture device 108 along the motion path 701 at the subsequent time for a plurality of subsequent image captures at the plurality of positions.

The processor 101 illustrated in FIG. 1 is used to improve the corresponding computing devices for the various configurations provided for herein. In other words, the processor 101 does not rely on routine, conventional activities, but rather on a virtual configuration that is timeless. In other words, the user 201 does not have to be concerned about the physical location of an image capture device 108 at a particular time, or any corresponding physical accessories to maintain at that physical location. The processor 101 records previously determined positions so that a physical image capture device 108 may be repositioned at that physical position via feedback to the user for subsequent filming. Accordingly, the processor 101 improves the precision at which images may be captured without the cumbersome restrictions associated with physical support devices such as tripods, camera cranes, motion control arms, dollies, tracks, etc. The processor 101 allows for unrestricted filming in that filming may be repeated from the same angle or motion path at various time periods after the first element is filmed.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:
    determine a position of an image capture device with respect to a physical object, the position corresponding to a vantage point for an initial image capture of the physical object performed by the image capture device at a first time;
    generate an image corresponding to the position;
    display the image on the image capture device; and
    output one or more feedback indicia configured to direct a user to orient the image capture device to the image for a subsequent image capture at a second time within a predetermined tolerance threshold of the vantage point.

2. The computer program product of claim 1, wherein the one or more feedback indicia comprises a visual indicator.

3. The computer program product of claim 1, wherein the one or more feedback indicia comprises a haptic vibration.

4. The computer program product of claim 1, wherein the computer is further caused to determine the position of the image capture device with respect to the physical object via one or more sensors.

5. The computer program product of claim 4, wherein the one or more sensors comprise an accelerometer, a gyroscope, a magnetometer, a GPS, a liquid gravitational sensor, a radio signal strength sensor, a direction detector, or a combination thereof.

6. The computer program product of claim 1, wherein the image capture device comprises a smartphone, a tablet device, a virtual reality headset, augmented reality glasses, or a camera.

7. The computer program product of claim 1, wherein the computer is further caused to automatically perform the subsequent image capture upon the image capture device being positioned within the predetermined tolerance threshold of the vantage point at the second time.

8. The computer program product of claim 1, wherein the one or more feedback indicia includes the image of the physical object corresponding to the vantage point for the initial image capture.

9. A computer program product comprising a non-transitory computer readable storage device having a computer readable program stored thereon, wherein the computer readable program when executed on a computer causes the computer to:
  determine a plurality of positions of an image capture device with respect to a physical object, the plurality of positions corresponding to a motion path of vantage points of the physical object at a subsequent time;
  generate a first plurality of images corresponding to the motion path;
  display at least one of the first plurality of images on the image capture device;
  output one or more feedback indicia configured to direct a user to orient the image capture device along the motion path at the subsequent time; and
  generate at the subsequent time a second plurality of images captured at the plurality of positions.

10. The computer program product of claim 9, wherein the one or more feedback indicia comprises a visual indicator.

11. The computer program product of claim 9, wherein the one or more feedback indicia comprises a haptic vibration.

12. The computer program product of claim 9, wherein the computer is further caused to determine the plurality of positions of the image capture device with respect to the physical object via one or more sensors.

13. The computer program product of claim 12, wherein the one or more sensors comprise an accelerometer, a gyroscope, a magnetometer, a GPS, a liquid gravitational sensor, a radio signal strength sensor, a direction detector, or a combination thereof.

14. The computer program product of claim 9, wherein the image capture device comprises a smartphone, a tablet device, a virtual reality headset, augmented reality glasses, and a camera.

15. The computer program product of claim 9, wherein the computer is further caused to automatically generate the second plurality of images at the plurality of positions.

16. A computer program product comprising a non-transitory computer readable storage device having a computer readable program stored thereon, wherein the computer readable program when executed on a computer causes the computer to:
  receive a plurality of positions of an image capture device with respect to a physical object corresponding to a motion path;
  generate a plurality of images corresponding to the motion path;
  display the plurality of images on the image capture device; and
  output one or more feedback indicia configured to direct a user to orient the image capture device along the motion path with respect to a plurality of vantage points of the physical object, wherein the plurality of positions correspond to the plurality of vantage points, respectively.

17. The computer program product of claim 16, wherein the motion path was originally generated with respect to the plurality of vantage points by a device distinct from the image capture device.

18. The computer program product of claim 16, wherein the motion path was originally generated independently of the plurality of vantage points with respect to the physical object.

19. The computer program product of claim 16, wherein the one or more feedback indicia comprises a visual indicator.

20. The computer program product of claim 16, wherein the one or more feedback indicia comprises a haptic vibration.

21. The computer program product of claim 16, wherein the computer is further caused to generate a second plurality of images at the plurality of positions.

* * * * *